Nov. 10 1925.
A. F. SULZER
1,560,620
PROCESS OF MANUFACTURING CELLULOSE ACETATE
Filed Jan. 28, 1925
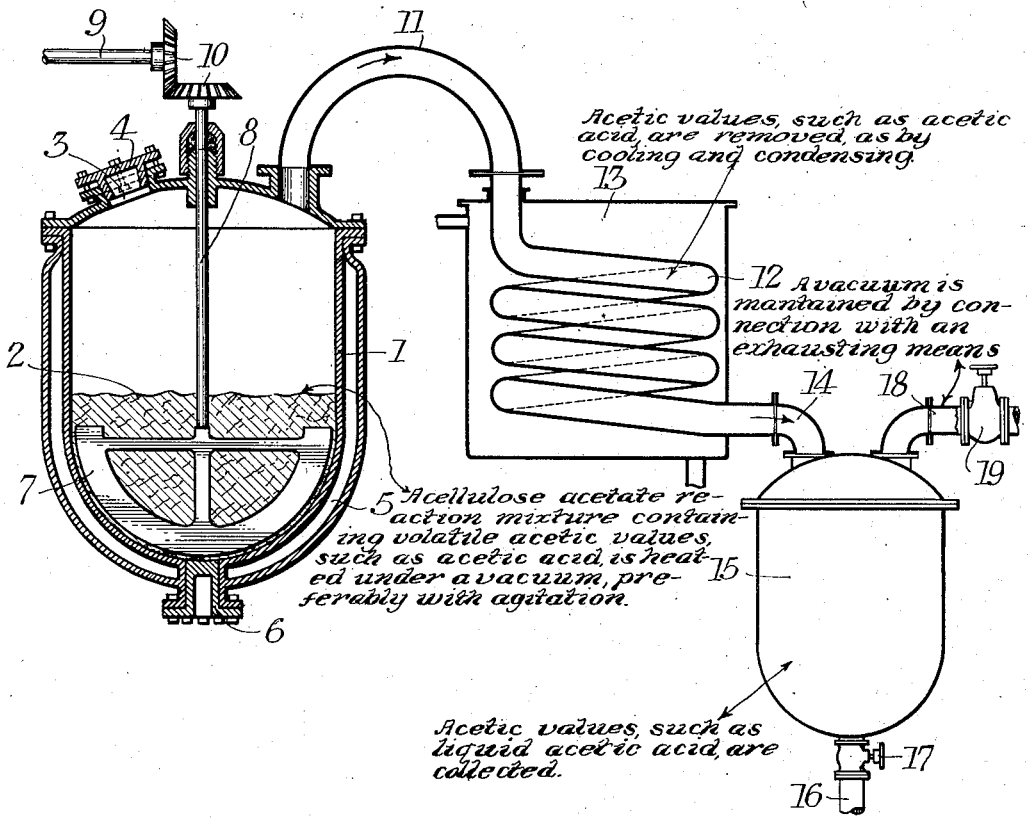
INVENTOR.
Albert F. Sulzer,
BY R. L. Stinchfield
ATTORNEY Patented Nov. 10, 1925.

1,560,620

UNITED STATES PATENT OFFICE.

ALBERT F. SULZER, OF ROCHESTER, NEW YORK, ASSIGNOR TO EASTMAN KODAK COMPANY, OF ROCHESTER, NEW YORK, A CORPORATION OF NEW YORK.

PROCESS OF MANUFACTURING CELLULOSE ACETATE.

Application filed January 28, 1925. Serial No. 5,396.

*To all whom it may concern:*

Be it known that I, ALBERT F. SULZER, a citizen of the United States of America, residing at Rochester, in the county of Monroe and State of New York, have invented certain new and useful Improvements in Processes of Manufacturing Cellulose Acetate, of which the following is a full, clear, and exact specification.

This invention relates to processes of manufacturing cellulose acetate, and more particularly to the recovery of valuable materials during such processes. One object of the invention is to lessen the cost of such manufacture. Another object of the invention is to provide a simple, rapid, and inexpensive process for recovering acetic values, such as acetic acid and acetic anhydride, from cellulose acetate reaction mixtures. Still another object of the invention is to provide a process in which said acetic values can be recovered in a comparatively pure condition. Other objects will hereinafter appear.

In the accompanying drawing the single figure is a diagrammatic side elevation, partly in vertical section, showing one form of apparatus in which my process may be carried out, the relative sizes of the elements being exaggerated for the sake of clearness.

In the manufacture of cellulose acetate acetylating agents act on cellulose in the presence of catalysts. The reaction mixture may, for instance, initially contain cellulose, acetic anhydride, acetic acid and a solid or liquid catalyst, such as sulfuric acid. The mass will, of course, contain the products of the reaction as the latter proceeds. A typical example of this general type is given in U. S. Reissue Patent No. 12,637, Miles, Apr. 23, 1907. During the course of the reaction chloroform-soluble cellulose acetate is first produced. Then a hydrolyzing mixture containing a small, but adequate amount of water, is introduced, so as to convert the cellulose acetate into the acetone-soluble species. Any excess or unused acetic anhydride which is present at the end of the chloroform-soluble stage is converted into acetic acid by the addition of water. It is convenient to use sufficient water in the hydrolyzing mixture to convert the excess acetic anhydride into acetic acid and cooperate in the hydrolysis.

At the end of the chloroform-soluble stage there are present in the reaction mixture valuable amounts of acetic values, such as acetic anhydride and acetic acid (and in some cases acetyl chloride). But where the reaction mixture is carried to the acetone-soluble stage, the acetic values will be in the form of acetic acid. These acetic values, because of their high cost, have a very important bearing upon the cost of the cellulose acetate which is produced. If they are not recovered, the loss per pound of cellulose acetate produced is undesirably high. It is, therefore, very desirable to recover them inexpensively and in a condition in which they can be used again for further acetylation. Thus the cost per pound of the product may be very much cheapened.

Where these acetic values have been washed away from the finished cellulose acetate, the resultant dilute solutions are difficult to treat, in order to recover the values. Evaporating operations and chemical reaction steps have been found to be undesirably complicated or expensive.

Acetic values have also been recovered from the reaction mixture by taking them up in a gaseous vehicle, such as air, and then recovering the vapors from the vehicle, as by condensation. This operation is generally conducted at approximately atmospheric pressure.

I have found, however, that the recovery of the acetic values can be effectively carried out by distilling them from a reaction mixture under pressures lower than atmospheric pressure. In the preferred form of my invention the reaction mixture is kept thoroughly agitated during the distillation and a sufficient vacuum is maintained to permit a rapid evolution of vapors of acetic values from the reaction mixture without overheating the latter.

It is well known that if an acetic acid reaction mixture be heated to a high temperature for a substantial length of time, the cellulose acetate will be adversely affected. If it be maintained, for example, at 118° C., the boiling point of acetic acid at atmospheric pressure, for several hours, it may become entirely unsuitable for film manufacture. By using a relatively strong vacuum during the distillation, the boiling point of acetic acid is lowered to such a point that vapors of acetic acid will be rapidly evolved without the need of subjecting the reaction mixture to dangerous temperatures.

The distillation may be carried out in many kinds of apparatus, the one shown in the drawing being merely illustrative of a useful form. Of course, all of the parts of the apparatus, which contact with the corrosive materials, are made of adequately resistant materials usually employed for that purpose. The receptacle 1 into which the cellulose acetate reaction mass 2 is loaded through any suitable opening 3, normally closed by an air-tight cover 4, is surrounded by a heating jacket 5 in which a suitable heating fluid, such as hot water or steam may be circulated in the way customary in this art. At the bottom of receptacle 1 is a removable closure 6 which facilitates the removal of the contents when the distillation is completed. The reaction mixture 2 is thoroughly agitated by blades 7 on shaft 8, driven from power shaft 9 through gears 10.

The space above the reaction mixture 2 in receptacle 1 is connected through a pipe 11 with a condensing worm 12 in the cooling chamber 13, this worm being connected at the bottom by pipe 14 with receptacle 15, in which the recovered acetic values are collected. At the bottom of receptacle 15 is a pipe 16 controlled by a valve 17, through which the recovered values may be drawn off. At the top of receptacle 15 there is a pipe 18 controlled by a valve 19, said pipe 18 being connected with any known or preferred means (not shown) for maintaining subatmospheric pressure in the above described apparatus. This means may be one that maintains a very high vacuum, its effect being stepped down by valve 19, or it may include devices which are driven at various speeds, so as to regulate the vacuum effect.

It will be understood, of course, that all of the hereinabove described parts are in a substantially air-tight condition during the distillation.

In use, a charge of reaction mixture (say one in which cellulose acetate is in the chloroform-soluble state, or in the acetone-soluble state, in accordance with the above cited Miles reissue patent) is loaded into receptacle 1 and agitated by means of rotating blades 7. It is also heated by circulating a warming fluid in jacket 5. While the temperature may vary over quite a range, it is desirable, as stated above, to avoid prolonged use of any such temperatures as 118° C. By way of example, temperatures of 40° C. to 80° C. may be employed. The vacuum is maintained through connecting pipe 18, and the drop below atmospheric pressure is, of course, regulated according to the temperature to which the reaction mixture 2 is heated from the jacket 5. The higher the temperature, the more nearly can the pressure approach toward atmospheric. When the temperatures range from 40° C. to 80° C., for example, I prefer to use a vacuum of from 35 to 202 mm. of mercury. In practice the vacuum can be gradually increased until a satisfactory evolution of vapors of acetic acid takes place from reaction mixture 2.

The temperature maintained in the condensing worm 12 by cooling chamber 13 can also be varied. But it should not be so low as to cause solidification of acetic values in the worm. A temperature of 15.5° C. has been found useful where there is a slight amount of water present, because it enables satisfactory condensation to take place without clogging the condenser. Moreover, it keeps the loss of acetic values through pipe 18 at a minimum. If necessary, receptacle 15 may have heat-insulated walls, or it may be artificially cooled by any suitable or preferred means (not shown).

It is preferable to carry the distillation and agitation of reaction mixture 2 until the latter becomes a powdery or granular mass. When in this condition, its removal from receptacle 1, upon opening closure 6, is facilitated. This powdery or granular mass is in condition for rapid and uniform further treatment by reason of its very large aggregate surface. In other words, the powder has enormous surface relative to its mass, unlike the viscous liquid or flowable mixture from which it is preferably prepared.

Having thus described my invention, what I claim as new and desire to secure by Letters Patent is:

1. In the process of manufacturing cellulose acetate, the steps of heating, under a vacuum, a cellulose acetate reaction mixture containing volatile acetic values to evolve vapors of said values at a temperature below the one at which the cellulose acetate is degraded, and removing and liquefying said vapors.

2. In the process of manufacturing cellulose acetate, the steps of heating to a temperature below 118° C. a cellulos acetate reaction mixture containing acetic acid, maintaining the pressure thereof below atmospheric pressure during said heating to rapidly evolve vapors of acetic acid from said mixture, and condensing said vapors separate from said mixture.

3. In the process of manufacturing cellulose acetate, the steps of heating to a temperature between 40° C. and 80° C. a flowable cellulose acetate reaction mixture containing volatile acetic values, keeping the pressure thereof below atmospheric pressure during said heating to rapidly evolve vapors of said acetic values from said mixture, and removing and condensing said vapors, the operations of said steps being continued until the remainder of said mixture reaches a solid state.

4. In the process of manufacturing cellulose acetate, the steps of heating, under a vacuum, a cellulose acetate reaction mixture containing volatile acetic values to evolve vapors of said values at a temperature below the one at which the cellulose acetate is degraded, bringing fresh portions of said mixture to the surface thereof during said heating to assist the evolution of said vapors, and removing and liquefying said vapors.

5. In the process of manufacturing cellulose acetate, the steps of heating to a temperature below 118° C. a cellulose acetate reaction mixture containing acetic acid, agitating said mixture and maintaining the pressure in the space above said mixture below atmospheric during said heating and agitating to rapidly evolve vapors of acetic acid from said mixture, and condensing said vapors separate from said mixture.

6. In the process of manufacturing cellulose acetate, the steps of heating to a temperature between 40° C. and 80° C. a flowable cellulose acetate reaction mixture containing volatile acetic values, stirring the mixture and keeping the pressure in the space at the surface of said mixture below atmospheric pressure to rapidly evolve vapors of said values from said mixture, and removing and condensing said vapors, said evolution being continued until the remainder of said mixture becomes a mass of relatively small particles.

Signed at Rochester, New York this 20th day of January 1925.

ALBERT F. SULZER.